Oct. 11, 1932.     A. O. SPRIGGS     1,882,235
EMBALMING INSTRUMENT
Filed May 4, 1931
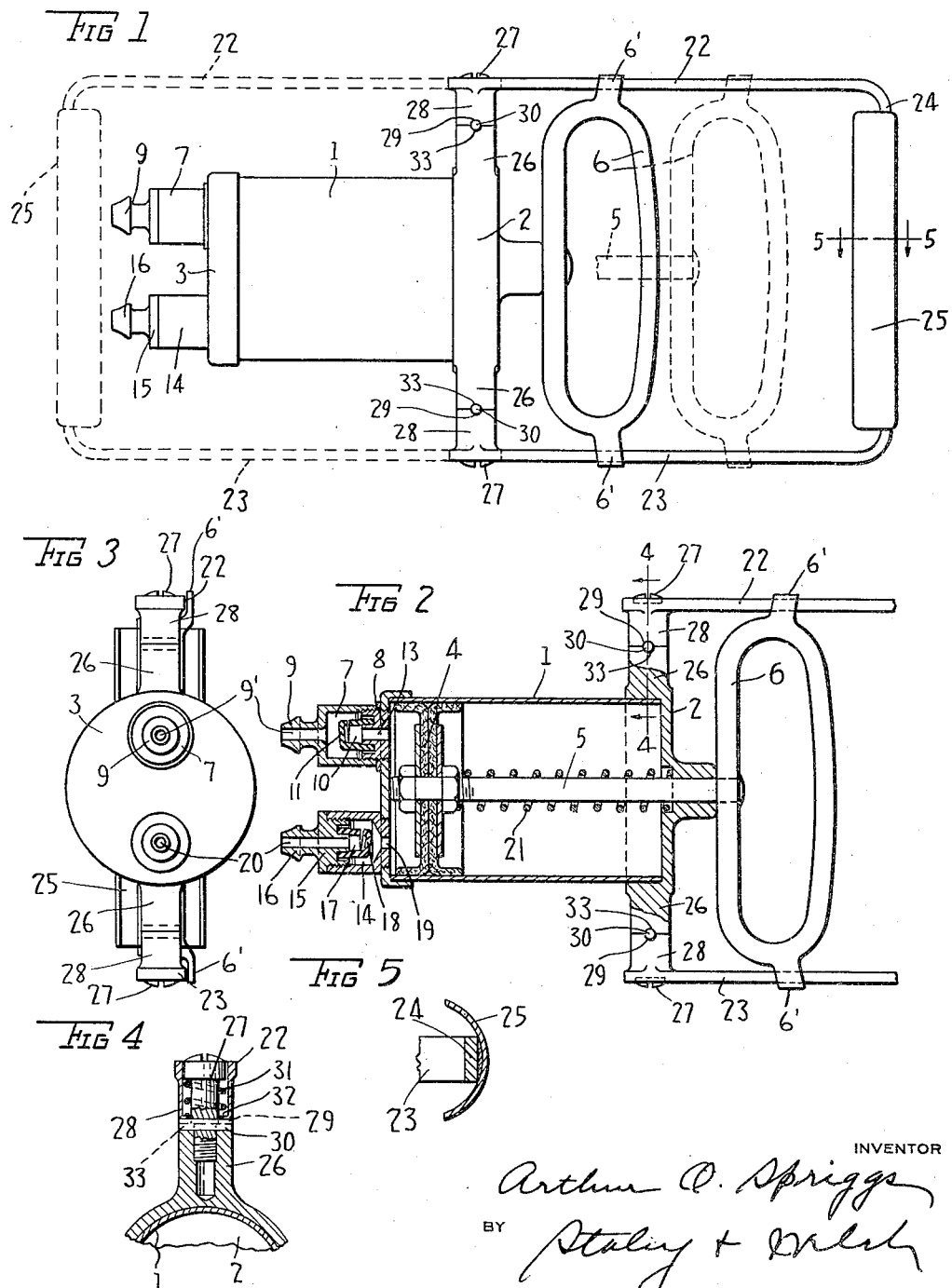

Patented Oct. 11, 1932

1,882,235

UNITED STATES PATENT OFFICE

ARTHUR O. SPRIGGS, OF SPRINGFIELD, OHIO, ASSIGNOR TO THE CHAMPION COMPANY, OF SPRINGFIELD, OHIO, A CORPORATION OF OHIO

EMBALMING INSTRUMENT

Application filed May 4, 1931. Serial No. 534,775.

This invention relates to embalming instruments, it more particularly relating to an instrument for the use of embalmers for aspirating or withdrawing morbid fluids from the body and injecting the embalming fluid.

In modern instruments of this character, it has been the practice to employ a manually-operated piston with suitable connections including check valves, such an instrument requiring the employment of both hands of the embalmer to perform the necessary operations of aspirating and injecting.

The object of my invention is to provide an instrument of this character so designed that it may be readily operated with but one hand of the embalmer, leaving the embalmer's other hand free for other necessary duties.

In the accompanying drawing:

Fig. 1 is a side-elevation of an instrument embodying the improvement.

Fig. 2 is a view partly in longitudinal section and partly in elevation with a portion of the palm rest broken away.

Fig. 3 is an end view.

Fig. 4 is a slightly enlarged section on the line 4—4 of Fig. 2.

Fig. 5 is a slightly enlarged section on the line 5—5 of Fig. 1.

Referring to the drawing, 1 represents a cylinder, 2 and 3 the heads of the cylinder, 4 a piston, 5 the piston rod which extends through the head 2, and 6 an elongated open finger-piece connected to the piston rod. The head 3 carries valve mechanism and tube connections of a well known kind. A valve chamber 7 is threaded on a plug 8 which is in turn threaded into the head 3, this chamber having an injecting nozzle 9 shaped to receive a flexible tube (not shown). The plug has an annular recess to receive an outwardly opening check valve in the form of a rubber cup-shaped member 10 which is partially slit adjacent its closed end to form the check valve proper 11. The plug 8 has an aperture 13 forming a communication between the cylinder and the cup, and the nozzle 9 a passage 9'.

A second valve chamber 14 is threaded into the head 3 and has threaded into the outer end thereof a plug 15 having a nozzle 16 to receive a tube (not shown). This plug is provided with an annular recess to receive a cup-shaped check valve member 17 having an inwardly opening valve proper 18 formed in the same manner as that described in connection with the outwardly opening check valve. The chamber 14 has an aperture 19 leading to the cylinder and the plug and its nozzle has an aperture 20 leading from its outer end to the interior of the cup-shaped check valve.

The construction so far described is of a well known form of injecting and aspirating instrument and the improvements which I have made thereon will now be explained.

Surrounding the piston rod 5, and interposed between the head 2 and the piston 4 is a coil spring 21 which acts to project the piston in the direction of the head 3. Connected to the head 2 is a palm rest consisting of a yoke-shaped member, the arms 22 and 23 of which have their free ends connected with the head 2 and the connecting cross-member 24 of which is provided with a rounded palm rest 25.

For the purpose of compactness in storing the instrument when not in use, I have pivotally connected the arms of the yoke-shaped palm rest with the cylinder head 2 in order that the palm rest may be swung to the dotted line position of Fig. 1. The cylinder head 2 has a pair of oppositely arranged trunnions 26 and threaded in each is a screw 27, the screw having a plain cylindrical portion upon which an enlarged boss 28 at the end of an arm of the palm rest is pivotally mounted.

In order to yieldably lock the yoke-shaped palm rest in either position, the inner end of each boss is provided with transverse recesses 29 adapted to receive a transversely-extending pin 30 which is driven into the plain cylindrical portion of the screw, and the boss 28 is provided with an enlarged bore to receive a small coil spring 31 which is interposed between the head of the screw and a shoulder 32 formed at the inner end of the enlarged bore of the boss, this enlarged bore being of sufficient size to receive the head of the screw. This spring acts to force the boss toward the pin and the pin and recesses are so positioned that when the yoke-shaped palm rest is in either completely operative or completely inoperative position, the bosses will yieldably engage the pins. The pin also engages recesses 33 in the end of the trunnion 26 to hold the screw from turning.

In operation the palm rest is thrown to the full line position shown, the ears 6' on the finger piece 6 acting as stop to quickly position it, and when it is desired to either aspirate or inject, the operator places his fingers through the finger piece 6 and rests his palm upon the palm rest 25, thus enabling him to move with one hand the piston against the tension of the spring 21, the spring acting to move the piston toward the head 3. When the piston is withdrawn from the head 3, with a tube connected to the nozzle 16, the operation of aspirating or withdrawing fluid from the body is performed, the spring acting to return the piston to normal position after the aspirating stroke. When a tube is connected with the nozzle 9 for injecting purposes, the operator withdraws the piston from the head 3 against the tension of the spring, and the spring performs the injecting operation by forcing the piston in the opposite direction.

It will be seen that by this arrangement that this instrument can be readily operated by a single hand of the operator, leaving his other hand free for other purposes.

Having thus described my invention, I claim:

1. In an instrument of the character described a cylinder, a spring operated piston therein, a piston rod extending through a head of the cylinder, a finger piece connected with the outer end of the rod, and a yoke-shaped member having the free ends of its arms pivotally connected with said cylinder and having a palm rest on its central portion, and means for yieldably locking said arms in different positions of adjustment.

2. In an instrument of the character described, a cylinder, a spring-operated piston therein, a piston rod extending through a head of the cylinder, a finger piece connected with the outer end of said rod, oppositely-arranged laterally-extending trunnions on said cylinder head, and a yoke-shaped member having the free ends of its arms pivotally connected with said trunnions and having a palm rest on the outer surface of its central portion.

3. In an instrument of the character described, a cylinder, a spring-operated piston therein, a piston rod extending through a head of the cylinder, a finger piece connected with the outer end of said rod, oppositely-arranged laterally-extending trunnions on said cylinder head, a yoke-shaped member having the free ends of its arms pivotally connected with said trunnions and having a palm rest on the outer surface of its central portion, and stop members carried by said finger piece for said yoke-shaped member.

4. In an instrument of the character described, a cylinder, a spring-operated piston therein, a piston rod extending through a head of the cylinder, a finger piece connected with the outer end of said rod, oppositely projecting trunnions on said cylinder head, a yoke-shaped member having a hollow boss on the inner side of the free end of each arm thereof, a headed pivot member carried by each trunnion with the headed portion thereof located in the corresponding hollow boss, a spring interposed between the head of each pivot member and an abutment on the inner end of the corresponding boss, and a pin carried by each trunnion adapted to engage a recess on the inner end of the corresponding boss.

5. In an instrument of the character described, a cylinder, a spring operated piston therein, a piston rod extending through the head of the cylinder, a finger piece connected with the outer end of the rod, a yoke-shaped member the intermediate portion of which forms a palm rest, and transversely arranged pivots for pivotally connecting the free ends of the arms of said yoke-shaped member with the head of said cylinder whereby said yoke-shaped member may be swung to a position to embrace the cylinder.

In testimony whereof, I have hereunto set my hand this 24th day of April 1931.

ARTHUR O. SPRIGGS.